United States Patent [19]
Rose et al.

[11] Patent Number: 5,273,385
[45] Date of Patent: Dec. 28, 1993

[54] BLIND HOLE INTEGRAL RIVET

[75] Inventors: A. Jay Rose, Independence; Michael A. Hamulak, Brooklyn, both of Ohio

[73] Assignee: A. J. Rose Manufacturing Company, Cleveland, Ohio

[21] Appl. No.: 905,536

[22] Filed: Jun. 29, 1992

[51] Int. Cl.$^5$ .............. F16B 19/08; B21D 31/02; B21D 53/24
[52] U.S. Cl. .............. 411/501; 411/504; 470/29; 72/325
[58] Field of Search .............. 411/501, 502, 504; 470/27, 29, 141, 148; 72/253.1, 254, 325

[56] References Cited

U.S. PATENT DOCUMENTS

| | | | |
|---|---|---|---|
| 446,466 | 2/1891 | Platt | 411/501 |
| 1,675,910 | 7/1928 | Riker | 72/325 |
| 2,361,770 | 10/1944 | Huck | 411/501 |
| 3,505,923 | 4/1970 | Neill | 411/501 |
| 4,245,491 | 1/1981 | Kondo et al. | 72/325 |
| 4,528,739 | 7/1985 | Kemp | 411/504 |

Primary Examiner—Neill R. Wilson
Attorney, Agent, or Firm—Pearne, Gordon, McCoy & Granger

[57] ABSTRACT

A method of forming blind hole rivets by displacing metal from a relatively thick base metal includes positioning a die against one side of the base metal having a cavity mating with the projection. A tool having a reduced diameter forward portion is pressed into the base metal from the side opposite the die to forward extrude metal into the die cavity during an initial portion of tool penetration. The end portion has a diameter substantially less than the diameter of the die cavity. Rearwardly of the end portion, the tool provides a cylindrical rearward portion having a diameter substantially equal to the diameter of the die cavity. After the forward portion penetrates into the base metal, the rearward portion penetrates the base metal and completes the displacement of material into the die cavity. The height of the rivet or projection can be at least about equal to the original thickness of the base metal without producing cracks or fractures.

11 Claims, 3 Drawing Sheets

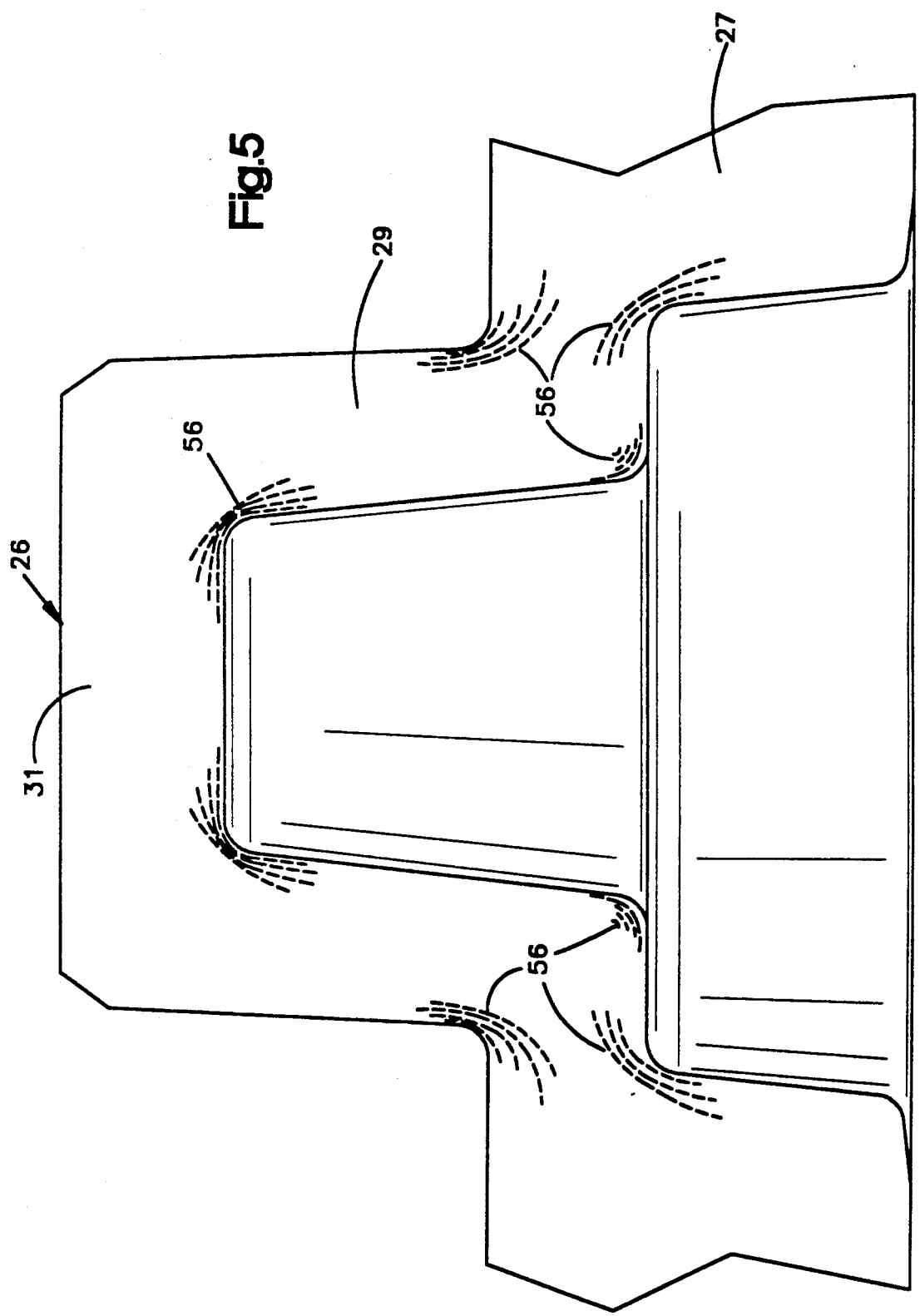

BLIND HOLE INTEGRAL RIVET

BACKGROUND OF THE INVENTION

This invention relates generally to integral rivets, and more particularly, to a novel and improved integral blind rivet structure and to a novel and improved method and apparatus for producing such integral blind rivets.

PRIOR ART

It is known to deform sheet or sheet metal to form integral blind rivets. Such rivets are generally used to connect the base metal to a separate piece of metal. In most instances, the integral rivet is formed in relatively thin sheet metal and has a diameter substantially greater than the thickness of the base sheet metal. The U.S. Pat. No. 2,321,755 describes such rivets and the method of producing same. The rivets of such type are formed by "drawing" metal in from the sheet metal surrounding the rivet.

It is also known to displace material from relatively heavy sheet base metal to form an integral rivet structure having a diameter approaching the initial thickness of the base material. However, in the past, it has been impractical, in most instances, to produce such rivets having a height exceeding two-thirds the initial thickness of the base metal.

Prior attempts to produce integral rivets having a height exceeding two-thirds the thickness of the base metal have usually resulted in distortions in the base metal around the projection and stresses that often produce cracks or fractures.

A publication entitled, "CONDENSED PRACTICAL AIDS FOR THE EXPERIENCED DIE ENGINEER, DIE DESIGNER, AND DIE MAKER, NEW AND REVISED EDITION," published by "Die Techniques", publishers, Medinah, Ill., describes, on page 132, a tooling structure for producing locating buttons having a height equal to 75 percent of the thickness of the base metal.

SUMMARY OF THE INVENTION

In accordance with the present invention, a hollow blind projection can be produced by displacing material from a relatively thick metal base material to form a projection having a height at least substantially equal to the initial thickness of the base material. Such displacement is produced without any substantial displacement or distortion of the base material adjacent to the projection and without producing fractures or cracks. Consequently, this invention provides an integral blind tubular projection which is strong and free from zones of weakness caused by cracks or fractures. In fact, the grain structure of the metal of the projection tends to smoothly follow the projection contour. With such grain structure, a high strength product is produced. Further, improved strength of the projection material results from the work hardening thereof.

The illustrated embodiment of this invention is an integral blind tubular rivet. However, in accordance with the broader aspects of this invention, the projection may provide other functions, such as, but not limited to, locating buttons or projections.

In the illustrated embodiment, the projection is formed with a substantially uniform wall thickness equal to about one-third the thickness of the base material and a projection height substantially equal to the thickness of the base material.

The projection is produced by positioning the base material against a die having a generally cylindrical die cavity extending to a substantially flat radial end surface. A tool is then pressed into the base material from the side opposite the cavity and in alignment with the cavity. The tool is provided with a reduced diameter end portion having a diameter substantially less than the diameter of the die cavity and a length substantially equal to the thickness of the base material. Rearwardly of this reduced diameter end portion, the tool provides a substantially cylindrical portion having a diameter substantially equal to the diameter of the die cavity. The increased diameter portion and the reduce diameter end portion are joined by a substantially radial shoulder.

As the tool enters the base material, the material adjacent to the cavity is displaced into the cavity, but remains joined to the base material, since the diameter of the end projection is substantially smaller than the diameter of the cavity. As the tool continues to penetrate into the base material, the rearward increased diameter portion of the tool engages and enters the base material on the side thereof, remote from the die cavity, and continues the displacement of the base material into the cavity.

In the illustrated embodiment, the increased diameter portion of the tool is pressed into the base material a distance substantially equal to two-thirds of the initial thickness of the base material. This penetration of the increased diameter portion causes the material within the cavity to flow out into the corners, converting what was initially a rounded end projection, to a substantially flat end projection having a diameter substantially equal to the diameter of the die cavity adjacent to the inner end face thereof.

With this invention, an integral blind tubular rivet is formed having superior strength and a height at least about equal to the initial thickness of the base material from which it is formed. Further, with this invention, novel and improved method and apparatus is provided for producing such integral projections.

These and other aspects of this invention are illustrated in the accompanying drawings and are more fully described in the following specification.

BRIEF DESCRIPTION OF THE DRAWINGS

FIG. 5 is an enlarged section of the rivet projection illustrating the general arrangement of the grain structure produced.

DETAILED DESCRIPTION OF THE DRAWINGS

Figure 1:
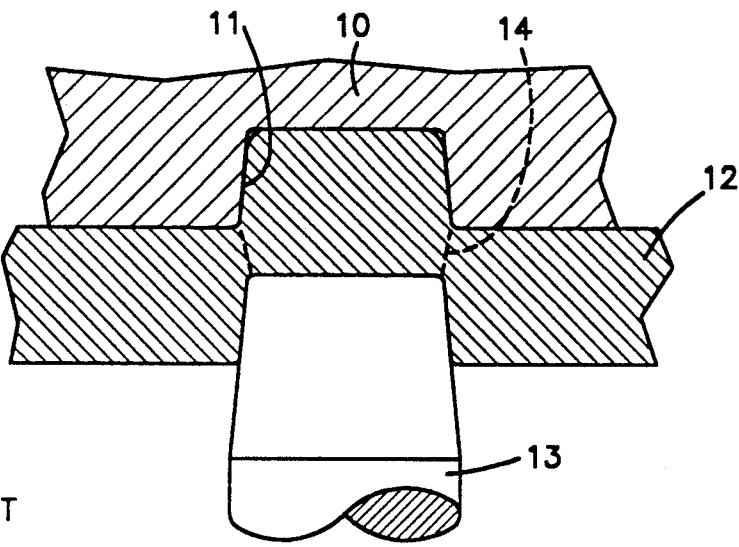
FIG. 1 illustrates one prior art method for producing rivets or projections.

FIG. 1 illustrates the manner in which integral rivets have been produced in low carbon steel, known as "AKDQ". Such rivets have been produced by positioning a die 10 having a cavity 11 on one side of the piece of base metal 12 while pressing a tool 13 into the opposite side. As the tool enters the base metal, the base metal is displaced from the opposite side into the cavity.

If an attempt is made to produce a rivet having too great a height, the tool acts as a punch, and the material fractures along a zone represented by the dotted line 14. In such case, the displaced material forms a separate slug, rather than an integral rivet or projection.

The depth the tool can be pressed into the base metal before the slug separates is a function of the ductility of the base metal. The tool can be pressed into the base metal a greater percentage of the thickness when the metal has a greater ductility. Conversely, the slugs separate with less tool penetration when the metal is harder and less ductile.

Typically, a tool can be pressed into low carbon steel, such as "AKDQ" steel, about two-thirds the thickness of the base metal, without rupture. Therefore, integral projections or rivets having a height equal to about two-thirds of the thickness of the base metal can be reliably formed, as illustrated in FIG. 1. However, the method of FIG. 1 cannot be used to produce an integral projection or rivet having a height equal to the thickness of the base metal, since that would require that the tool be pressed all the way through the base metal, causing slug separation, even in very ductile material.

A modified procedure has been attempted to permit the formation of projections having greater height with respect to the thickness of the base metal. In such procedure, a tool having a diameter substantially greater than the diameter of the cavity in the die is used. Since the tool is larger in diameter, a given penetration displaces a greater volume of material. However, some of the displaced material radially beyond the die cavity does not enter the cavity. Instead, it causes a raised portion around the projection. This raised portion interferes with the proper location of the piece being connected by the rivet. Further, because the displaced material does not flow smoothly into the cavity, an undesirable grain structure often results which weakens the connection between the projection and the base metal. In fact, fractures and cracks tend to occur.

Figure 2:
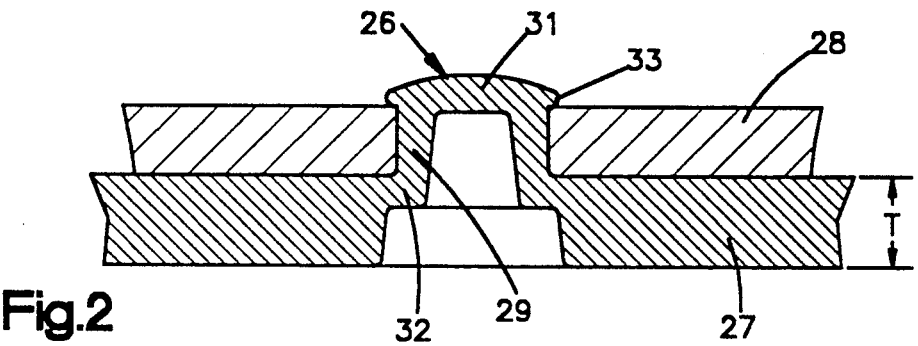
FIG. 2 illustrates an integral blind rivet in accordance with the present invention connecting two pieces of metal.

FIG. 2 illustrates a blind integral tubular rivet 26, in accordance with the present invention, connecting the rivet base material 27 to a separate piece of metal 28 having a thickness approaching the thickness of the base metal 27. Such rivet includes a tubular wall 29 extending to a blind, or closed end 31, at the outer end of the rivet. The tubular wall 29 is joined to the base metal 27 by a junction portion 32 which, in this illustrated embodiment, has a thickness substantially equal to one-third of the initial thickness "T" of the base metal 27.

The rivet 26 is formed in the manner discussed and described in detail below, and after it is formed, the outer end of the rivet is deformed radially at 33 to extend along the outer side of the piece 28 remote from the adjacent surface of the base metal 27.

Because the material forming the rivet is work hardened to a substantial degree during the formation of the rivet, the riveting procedure itself is, preferably, produced by an orbital riveting system, known to those skilled in the art, or a brackering riveting procedure, also known to those skilled in the art.

Figure 4:
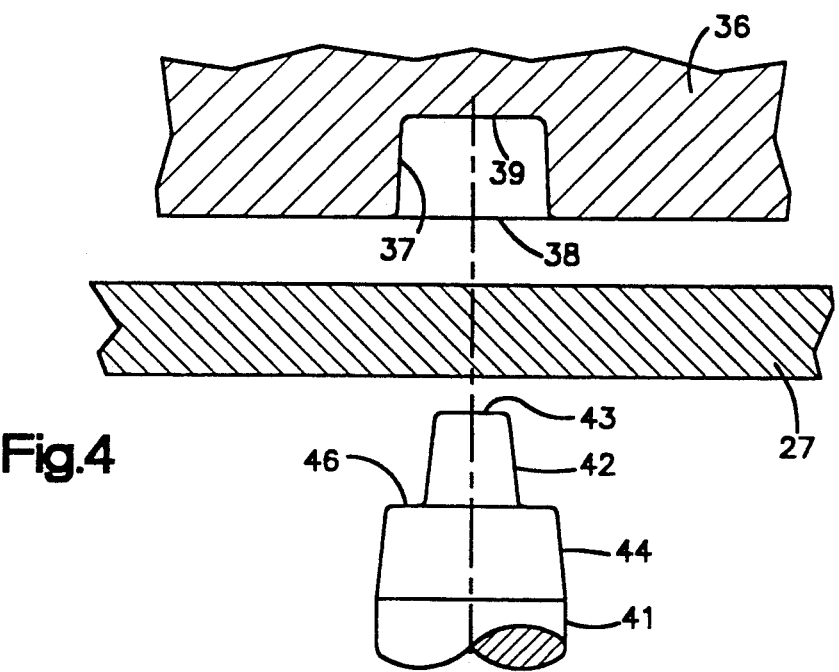
FIG. 4 is an exploded view illustrating the tool and die for producing the rivet projection.

The rivet, according to the present invention, is formed by tooling, best illustrated in FIG. 4, including a die 36 having a cylindrical die cavity 37 therein. The die cavity extends from an open end 38 to a closed, planar radially extending inner end 39. The tooling also includes a tool 41 having a reduced diameter cylindrical end portion 42 extending from a substantially flat end 43. Rearwardly of the end portion 42, the tool 41 provides a cylindrical rearward portion 44 joined to the end portion 42 by a substantially radial shoulder 46. Both the tool and the die are provided with draft, exaggerated in the drawings, so that the components can be separated at the completion of the forming operation.

In the illustrated embodiment, the end portion 42 has a length substantially equal to the thickness "T" of the base metal 27, and a diameter substantially less than the diameter of the die cavity 37. The rearward portion 44 has a diameter substantially equal to the diameter of the die cavity 37. In the illustrated embodiment, the diameter of the rearward portion 44 has a diameter equal to the diameter of the entrance of the die cavity.

In order to form the rivet, the die 36 is positioned on one side of the base metal 27 with the open end of the die cavity engaging the adjacent side 47 of the base metal. The tool 41 is then positioned in alignment with the cavity 37 on the opposite side 48 of the base metal 27. The tool is then pressed into the base metal 27 with the initial penetration of the tool into the base metal 27 being provided by the reduced diameter end portion 42. FIG. 3a illustrates the condition which exists when the end portion 42 has been pressed fully into the base metal, and before the rearward portion 44 actually enters the base metal.

As the end portion 42 enters the base metal, portions thereof are displaced forwardly into the die cavity 37. This displacement is a form of forward extrusion, which causes the displaced metal within the die cavity to have a generally spherical end surface 51 extending from the side 47 of the base metal 27.

Because the end portion 42 has a diameter substantially less than the diameter of the die cavity, the displaced metal within the die cavity remains integrally attached to the adjacent base metal.

Figure 3C:
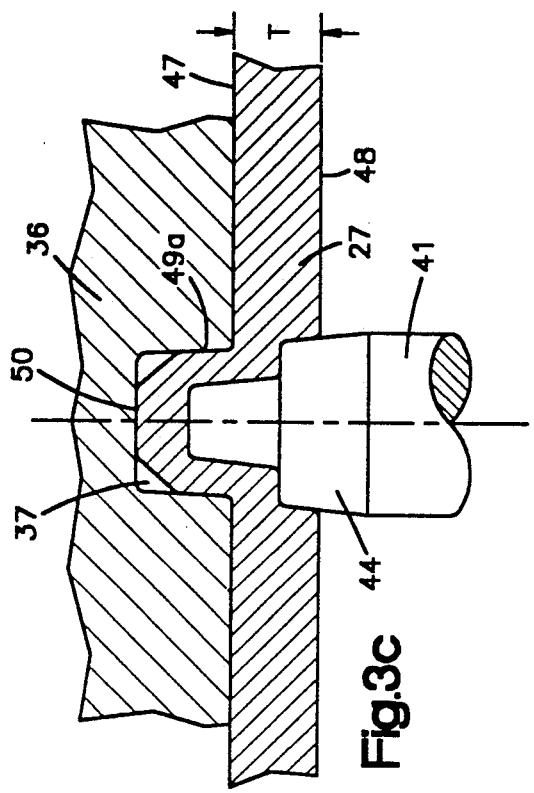
FIGS. 3a through 3d illustrate the formation of an integral rivet in accordance with the present invention, illustrating the tool in progressive positions of penetration into the base metal.
Figure 3D:
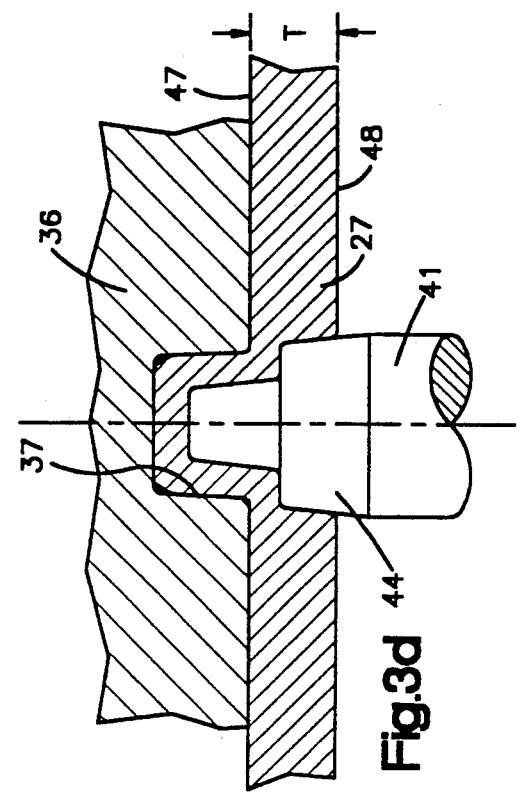
Figure 3A:
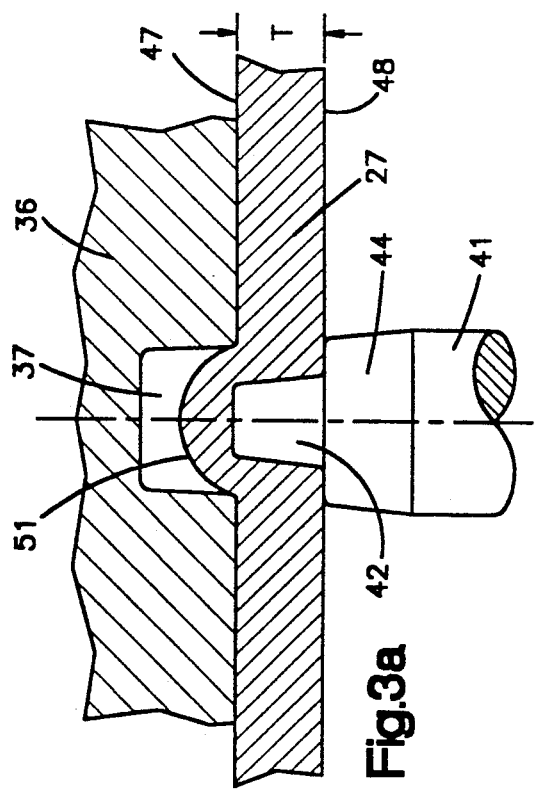
Figure 3B:
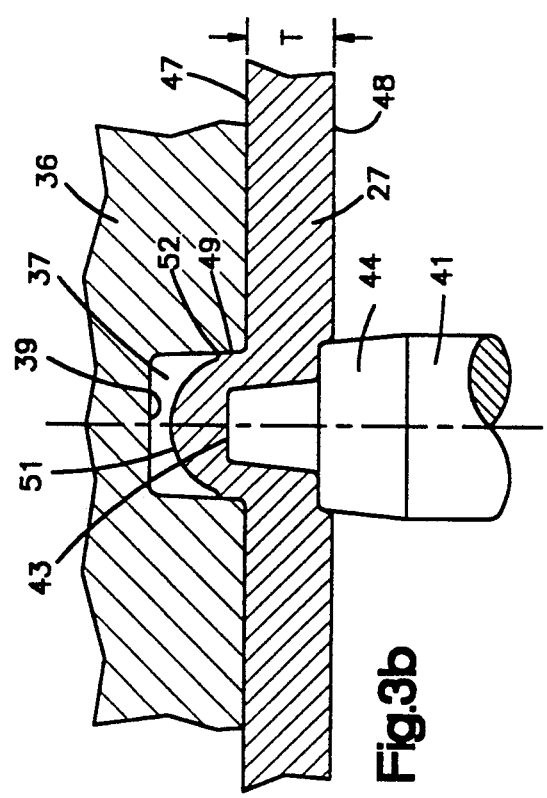

As the tool is caused to continue to penetrate into the base metal, a position illustrated in FIG. 3b is reached. At this point in the formation of the rivet, the rearward portion 44 of the tool commences to penetrate into the side 48 of the base metal 27, and the flat end 43 of the end portion 42 extends beyond the plane of the side 47 of the base material. At this point in the formation of the rivet, the penetration of the rearward portion 44 into the base metal causes a displacement of material into the die cavity having a diameter equal to the diameter of the die cavity. Consequently, the material located within the die cavity has a cylindrical outer surface 49 which joins the generally spherical end portion 51 at a junction 52.

The height of the cylindrical surface portion 49 is substantially equal to the depth of penetration of the rearward portion 44, since the volume of material displaced as the tool moves from the position of FIG. 3a to the position of FIG. 3b equals the volume of material within the cylindrical outer surface 49. At this point in the process of forming the rivet, the cylindrical outer surface 49 remains spaced from the inner end 39 of the die cavity 37.

FIG. 3c illustrates the condition as the tool 41 continues to penetrate into the loose metal. In such position, the rearward portion 44 of the tool has penetrated into the base metal 27 a distance slightly less than one-half of the thickness "T" of the base metal. The continued movement of the rearward portion 44 into the base metal continues to displace metal into the die cavity 37.

The height of the cylindrical portion 49a is again substantially equal to the depth of penetration of the rearward portion 44 of the tool into the base metal 27. At this point in the rivet formation, the spherical end portion engages the inner end wall 39 of the die cavity, and the inner end of the displaced metal commences to flatten and flow radially outward, as illustrated at 50.

The rivet forming operation is completed when the punch penetration reaches the point illustrated in FIG. 3d. In such position, the rearward portion 44 of the punch has penetrated into the base material 27 through a distance equal to about two-thirds of the initial thickness "T" of the base material. Since the end portion 42 of reduced diameter has a length substantially equal to the original thickness "T" of the base material, it extends beyond the one side 47 a distance equal to about two-thirds of the initial thickness of the base material. This leaves a non-hollow end portion, in the illustrated embodiment, which has a thickness equal to about one-third of the initial thickness "T" of the base material and an overall projection or rivet height equal to about the initial thickness "T" of the base material.

Further, the inner corner of the integral projection is substantially filled to provide an ideal rivet shape. FIG. 5 illustrates the grain structure 56 adjacent to the corners in the finished rivet 26. As illustrated, the grain structure 56 conforms to such corners indicating that the metal flows smoothly around such corners during the forming operation. This grain structure establishes that a strong crack or fracture-free structure is provided.

In the particular illustrated embodiment, the base metal being deformed is a low carbon steel having good drawing qualities, so it is possible to cause punched penetration until the rearward portion projects about two-thirds of the distance through the base metal. As discussed above, in connection with the prior art illustration of FIG. 1, this would normally cause a projection height equal to about two-thirds of the initial thickness "T" of the base metal were it not for the reduced diameter end portion 42. In the illustrated embodiment in which the integral rivet projects a distance substantially equal to the initial thickness "T" of the base metal, the reduced diameter end portion 42 must have a volume equal to a volume at the inner end of the cavity, representing about one-third of the height of the projection.

With this invention, it is possible to also produce integral rivets having a height exceeding the initial thickness "T" of the base material to some extent. This is accomplished by increasing the diameter of the inner end portion 42, so that the wall thickness of the integral projection in the tubular zone is reduced to some extent. Further, if desired, the length of the inner end portion can be increased, to some extent, to reduce the thickness of the end wall of the integral projecting rivet.

Although the preferred embodiment of this invention has been shown and described, it should be understood that various modifications and rearrangements of the parts may be resorted to without departing from the scope of the invention as disclosed and claimed herein.

What is claimed is:

1. An integral tubular blind rivet comprising a base metal having a predetermined thickness, a projection extending from one side of said base metal a distance substantially equal to said thickness, said projection including a tubular portion having a length substantially equal to two-thirds of said predetermined thickness and an imperforate end portion closing the outer end of said tubular portion having a thickness substantially equal to about one-third of said predetermined thickness, said tubular portion providing a central passage extending to a location spaced inwardly from said one side by a distance substantially equal to one-third of said predetermined thickness, said base metal providing a substantially cylindrical cavity extending from the opposite side of said base metal a distance substantially equal to two-thirds of said predetermined thickness and joining said passage.

2. An integral tubular blind rivet as set forth in claim 8, wherein a substantially radial shoulder surface joins the inner end of said passage and said cavity.

3. An integral blind hole projection extending from one side of a base metal a distance at least substantially equal to the initial thickness of said base metal comprising, a cylindrical tubular portion extending from said one side of said base metal to a closed cylindrical end portion, said tubular portion including an axially extending cylindrical passage extending inwardly into said projection past said one side of said base metal, and a cylindrical cavity extending from the opposite side of said base metal to a substantially radial shoulder joining with said passage, said cylindrical cavity having a diameter substantially equal to the outer diameter of said tubular portion and a depth less than said initial thickness.

4. Tooling for producing an integral tubular blind rivet comprising a die formed with a substantially cylindrical die cavity extending from an open end inward to a substantially planar inner end, said cavity being sized to mate with the outer surface of said rivet, and a tool having a reduced diameter end portion having a diameter substantially less than the diameter of said cavity, said tool providing a rearward portion extending from said end portion having a diameter at least substantially equal to the diameter of said cavity, said tool being operable when pressed into one side of a base metal plate to displace metal into said cavity to substantially fill said cavity.

5. A method of deforming a metal plate having a predetermined thickness to provide a blind hollow projection extending from one side of said plate a distance at least substantially equal to said predetermined thickness comprising positioning said plate against a die having a cylindrical blind cavity open at a first end adjacent to said plate and providing a substantially radial inner end wall remote from said first end and spaced therefrom by a distance at least substantially equal to said predetermined thickness, providing a tool with a substantially cylindrical end portion having a diameter substantially less than the diameter of said cavity and length substantially equal to said predetermined thickness and also providing said tool with a substantially cylindrical rearward portion extending back from said end portion having a diameter substantially equal to the diameter of said cavity, and pressing said tool into said plate from the opposite side thereof and in alignment with said cavity until said cavity is substantially filled.

6. A method as set forth in claim 1, including providing said tool with a substantially radial shoulder joining said end portion and said rearward portion.

7. A method as set forth in claim 2, including selecting a low carbon steel metal plate, and pressing said tool into said metal plate until said rearward portion extends into said metal plate a distance substantially equal to two-thirds of said initial thickness.

8. A method of deforming a base metal of a predetermined thickness to produce closed end integral projection extending from one side thereof having a height at least substantially equal to said predetermined thickness and a predetermined diameter comprising, positioning a die against said one side of said base metal having a blind die cavity shaped to mate with said projection, and pressing a tool into the side of said base metal opposite said cavity to displace said base metal into said cavity, said tool having a substantially cylindrical end portion having a diameter substantially less than said predetermined diameter and a rearward portion extending back from said end portion having a diameter substantially equal to said predetermined diameter, pressing said tool into said base metal until said rearward portion approaches a depth tending to cause fracture of said displaced material from the remainder of said base metal, and selecting the diameter and length of said end portion to cooperate with said rearward portion to provide a cavity within said base metal and projection having a volume substantially equal to the volume of metal in said projection.

9. A method as set forth in claim 4, including providing said cavity with a substantially planar inner end joining the sides of said cavity at a relatively sharp corner, and displacing metal to substantially fill said corner.

10. A method of deforming a base metal having a predetermined thickness to produce an integral blind rivet having a height at least substantially equal to said predetermined thickness and a predetermined diameter comprising, confining the deformed base metal in a die cavity having a depth equal to said height and a diameter equal to said predetermined diameter, and displacing base metal into said die cavity by forming a depression in the side of said base metal opposite said cavity having inner and outer parts, sizing said outer part to have a diameter at least substantially equal to said predetermined diameter and a depth substantially equal to two-thirds of said predetermined thickness, and sizing said inner part extending from said outer part to have a diameter substantially less than said predetermined diameter and a length at least substantially equal to said predetermined thickness.

11. A method of forming integral projections extending from one side of a base metal and having a height at least substantially equal to the initial thickness of said base metal comprising determining the depth of penetration a cylindrical tool can penetrate into said base metal to displace a cylindrical projection into an aligned cylindrical die cavity without causing slug separation or weakening fractures, providing a die cavity against one side of said base metal shaped to mate with said integral projection, forming a tool with a reduced diameter forward end portion having a diameter substantially less than the diameter of said cavity and a rearward cylindrical portion having a diameter at least substantially equal to the diameter of said cavity, sizing said forward end portion with respect to its diameter and length to cause filling of said cavity when said rearward cylindrical portion is pressed into said base metal to said depth of penetration, and pressing said tool into said base metal causing displacement of said base metal to fill said cavity.

* * * * *

UNITED STATES PATENT AND TRADEMARK OFFICE
CERTIFICATE OF CORRECTION

PATENT NO. : 5,273,385
DATED : December 28, 1993
INVENTOR(S) : A. Jay Rose et al It is certified that error appears in the above-indentified patent and that said Letters Patent is hereby corrected as shown below:

Column 2, line 48, after "producing" insert --integral--.
Column 4, line 63, delete "loose" and insert --base--.
Column 6, line 13, (Claim 2, line 2), delete "8" and insert --1--.
Column 6, line 61, (Claim 6, line 1), delete "1" and insert --5--.
Column 6, line 64, (Claim 7, line 1), delete "2" and insert --6--.
Column 7, line 23, (Claim 9, line 1), delete "4" and insert --8--.

Signed and Sealed this

Nineteenth Day of July, 1994

Attest:

BRUCE LEHMAN

*Attesting Officer*  *Commissioner of Patents and Trademarks*